United States Patent [19]

Harvey

[11] 3,908,764
[45] Sept. 30, 1975

[54] METHOD OF TREATING PETROLEUM-BEARING FORMATIONS FOR SUPPLEMENTAL OIL RECOVERY
[75] Inventor: Robert R. Harvey, Pueblo, Colo.
[73] Assignee: Phillips Petroleum Company, Bartlesville, Okla.
[22] Filed: Nov. 25, 1974
[21] Appl. No.: 526,938

[52] U.S. Cl. .............................. 166/305 R; 166/273
[51] Int. Cl.² .................... E21B 43/22; E21B 43/24
[58] Field of Search......... 166/273, 274, 305 R, 295, 166/294

[56] References Cited
UNITED STATES PATENTS

| | | | |
|---|---|---|---|
| 2,747,670 | 5/1956 | King et al. ........................ | 166/270 |
| 3,306,870 | 2/1967 | Eilers et al. ...................... | 166/295 |
| 3,308,885 | 3/1967 | Sandiford......................... | 166/270 |
| 3,396,790 | 8/1968 | Eaton............................... | 166/270 |
| 3,581,824 | 6/1971 | Hurd................................ | 166/270 |
| 3,749,172 | 7/1973 | Hessert et al. ................... | 166/270 X |
| 3,762,476 | 10/1973 | Gall ................................. | 166/273 X |
| 3,766,983 | 10/1973 | Chiu ................................ | 166/270 X |
| 3,827,499 | 8/1974 | Norton et al. .................... | 166/305 R |
| 3,844,348 | 10/1974 | Stratton ........................... | 166/270 |
| 3,850,244 | 11/1974 | Rhudy et al. ..................... | 166/273 |

*Primary Examiner*—Stephen J. Novosad

[57] ABSTRACT

A polymer treatment method is used to improve mobility control in flooding a petroleum-bearing subterranean formation containing petroleum and connate water. Mobility is controlled by injection into the formation of a slug of an aqueous polymer mixture which has a viscosity sensitive to the salt concentration in the water mixed with same to form the slug. The polymer slug is injected into the formation and is followed with a slug of high-brine concentration water which is then followed with a second slug of water having a lower brine concentration than the first slug to control the mobility in the petroleum-bearing formation. Drive fluid is then injected into the formation to drive the petroleum therein to a well for removal and use.

7 Claims, No Drawings

METHOD OF TREATING PETROLEUM-BEARING FORMATIONS FOR SUPPLEMENTAL OIL RECOVERY

In recent years the shortage of petroleum and products produced therefrom has encouraged the development of new methods of secondary and tertiary recovery of petroleum from oil fields. Current development in methods for secondary and tertiary recovery has included the use of water soluble polymers which when mixed with water increase the viscosity thereof and improve waterflood petroleum recovery. The use of the polymer improves mobility control and, hence, the efficiency in petroleum recovery. However, the use of such polymers also increases the cost of pumping the slug into the formation and thereby reduces the economies of their use in efficiency improvement. It is also known that the higher viscosity polymer solutions have some polymer degradation from shear when same are pumped through the formations. The present invention relates to a method of injecting a polymer slug into a formation in a low viscosity state or condition to reduce pumping cost and polymer degradation and thereafter injecting other aqueous slugs to change the mobility of the formation containing the polymer slug. This is accomplished by using a polymer which has a viscosity sensitive to the salt concentration of the water forming the polymer slug and varying the salt concentration in certain of the subsequent aqueous slugs pumped into the formation.

The principal objects of the present invention are: to provide a method of treating a petroleum-bearing formation to improve the efficiency of secondary and tertiary oil recovery therefrom; to provide such a method which uses an aqueous polymer solution wherein the polymer has a viscosity which is sensitive to the salt concentration in the solution whereby the aqueous polymer solution can be pumped into a petroleum-bearing formation with a minimum of pumping costs and polymer degradation; to provide such a method wherein the mobility of the formation can be adjusted with the use of subsequent aqueous slugs of varying salt concentration pumped after the aqueous polymer solution has been injected into the petroleum-bearing formation; to provide such a method which is adapted for use in petroleum-bearing formations having connate water of either high or low brine concentrations; and to provide such a method which is well adapted for its intended use and economical to perform.

Other objects and advantages of the present invention will become apparent from the following detailed description wherein are set forth by way of illustration and examples certain embodiments of the present invention.

As required, detailed embodiments of the present invention are disclosed herein, however, it is to be understood that the disclosed embodiments are merely exemplary of the invention which may be embodied in various forms. Therefore, specific details disclosed herein are not to be interpreted as limiting but merely as a basis for the claims and as a representative basis for teaching one skilled in the art to variously employ the present invention in virtually any appropriate manner.

Mobility control in petroleum-bearing formations is measured in terms of relative mobility (RM) and retained relative mobility (RRM). Mathematically this is illustrated by the Darcy equation for single-phase flow, with mobility being represented by $m = k/\mu$ wherein $m$ is mobility, $k$ is permeability in millidarcys and $\mu$ is the viscosity of the liquid in centipoise; the Darcy equation is as follows:

$$Q = \frac{m \, A \, \Delta P}{L}$$

wherein Q is equal to flow rate in cubic centimeters per second; L is equal to length of core in centimeters; A is equal to cross sectional area of the core in square centimeters; and $\Delta P$ is equal to differential pressure in atmospheres.

Relative mobility (RM) for a formation core is defined and expressed by:

$$RM = \frac{m(\text{solution})}{m(\text{solvent})} = \frac{\Delta P(\text{solvent})}{\Delta P(\text{solution})}$$

(solution denoting the value for an aqueous solution of polymer and solvent denoting the aqueous solution without polymer). The $\Delta P$ or pressure drops are measured across a core of fixed length and fixed cross section and with the flow rate through the core being constant. The core is suitably mounted for conducting the tests and has pressure taps cooperating therewith which allow pressure drop measurements as fluid flows through the core. Retained relative mobility (RRM) is a value which is measured for a core wherein a polymer solution is injected into the core which is followed by a solvent injection to measure the mobility of the core with the solvent flowing therethrough. The retained relative mobility is measured according to the equation:

$$RRM = \frac{m((\text{solvent}) \, (\text{final}))}{m((\text{solvent}) \, (\text{initial}))} = \frac{P \, (\text{initial})}{\Delta P \, (\text{final})}$$

This can be better expressed in words by: the retained relative mobility is equal to the mobility of the solvent through a core after same has been treated with an aqueous polymer solution divided by the mobility of the solvent passing through the core before same has been treated with the aqueous polymer solution.

The values of relative mobility and retained relative mobility are used to describe the effects of treatment of a core with an aqueous polymer solution and solvent flushes. Relative mobility describes the ratio of the mobility of a polymer solution divided by the mobility of an aqueous brine solution from which the polymer solution or mixture is prepared. Retained relative mobility is defined as the mobility of the aqueous brine solution following the injection of the aqueous polymer mixture divided by the mobility of the aqueous brine solution before the polymer mixture was injected. Retained relative mobility is therefore a measure of the lasting effect of the polymer retained by the core in the presence of an aqueous brine solution. A relatively high retained relative mobility value would indicate that the retained polymer has little effect on the flow of brine and conversely a low relative retained mobility value would indicate that the polymer has more effect on the subsequent injection of brine.

To illustrate examples of relative mobility and retained relative mobility, the following tests were conducted.

TABLE I

The mobility of polymer solutions was tested in glass bead packs with polyacrylamide (Dow Pusher 700) in an amount of 250 ppm to form an aqueous mixture thereof. A preflush of 5 pore volumes of solvent which was then followed by a 5 pore volume flush of aqueous polymer solution followed by a 5 pore volume postflush of solvent. The glass bead packs were 500 md. having the same length.

The solvents used are synthetic brines made up as follows in distilled water. The different salts listed below are in parts per million (ppm) and added to distilled water in making up the solution.

| 1200 ppm Synthetic Brine | |
|---|---|
| NaCl | 910 ppm |
| $CaCl_2$ | 239 ppm |
| $MgCl_2 \cdot 6H_2O$ | 109 ppm |
| | 1258 ppm |

The above salts are dissolved in distilled water. When taking into account the water in the $MgCl_2 \cdot 6H_2O$ and corrected for densities the solution contains about 1200 ppm total dissolved solids of salt in distilled water.

| 51,000 ppm Synthetic Brine | |
|---|---|
| NaCl | 40,000 ppm |
| $CaCl_2$ | 10,600 ppm |
| $MgCl_2 \cdot 6H_2O$ | 4,760 ppm |
| | 55,660 ppm |

When this solution is corrected for density of the salts the concentration is about 51,400 ppm salt dissolved in distilled water and is rounded off and referred to as 51,000 ppm synthetic brine.

The following is a table of properties of the solvents used in testing the polymer solutions:

| Solvent and Flush | Viscosity of polymer solution cp at 10 sec.$^{-1}$ | RM | RRM |
|---|---|---|---|
| 1,200 ppm | 2.3 | 0.14 | 0.25 |
| 51,000 ppm | 1.45 | 0.35 | 0.43 |

Table I illustrates the relative mobility of a polymer solution passing through glass bead packs, in which the concentration of the polymer is 250 ppm in two different brine solutions, one of 1200 ppm and the other 51,000 ppm of salt in water. Tests such as those in Table I have been used in the art as a method of comparing the effectiveness of different polymer solutions and for comparing the same polymers in different brine concentration solutions on a common basis. The values of relative mobility and retained relative mobility obtained from such tests are thus valuable as comparative data but not necessarily numerically the same as would be obtained in cores of actual petroleum-bearing formation material. Nevertheless, from Table I it can be seen that the polymer in the higher brine concentration solution is less effective as indicated by the higher value of 0.35 compared to 0.14 value for RM. Also, the values for RRM show that the high brine has less retained effect after brine flow is resumed as indicated by the RRM value of 0.43 for the high brine test compared to the 0.25 for the low brine test. It will be demonstrated hereinbelow that the RRM value depends significantly on the salt concentration in the brine which is present and RRM values established in the presence of one brine can be changed by the presence of a different brine.

The present invention is illustrated in Table II below with Table II having extra steps included therein to show the effect of various steps in the treatment of sample cores and thereby more accurately disclose the overall effect of various treatment steps.

TABLE II

The following data illustrate the effect of change in brine concentration on retained relative mobility in Berea cores which have been previously treated with 0.2 percent by weight of Dri-Film 144 in toluene. This treatment is to make the cores more closely approximate petroleum-bearing formations.

Table II

| Steps | Injection Sequence[1] | | | | Residual Oil[2] | Mobility Control During Steps | | | |
|---|---|---|---|---|---|---|---|---|---|
| | 1 | 2 | 3 | 4 | | 1 RM | 2 RRM | 3 RRM' | 4 RRM'' |
| Test I | $p_{lr}$ | W | S | W | None | 0.06 | 0.08 | 0.34 | 0.16 |
| Test II | $p_{lr}$ | W | S | W | Yes | 0.06 | 0.09 | 0.16 | 0.10 |
| Test III | $P_s$ | S | W | S | None | 0.12 | 0.18 | 0.10 | 0.22 |
| Test IV | $P_s$ | S | W | S | Yes | 0.09 | 0.12 | 0.04 | 0.14 |

[1] $p_{lr}$ = Injection of 250 ppm Dow Pusher 700 in 1,200 ppm total dissolved solids in water (weak brine).
$P_s$ = Injection of 250 ppm Dow Pusher 700 in 51,000 ppm total dissolved solids in water (strong brine).
W = Injection of 1,200 ppm total dissolved solids in water (weak brine).
S = Injection of 51,000 ppm total dissolved solids in water (strong brine).
[2] Crude oil produced from the North Burbank Field.

Table II illustrates the present invention and, although only partially hydrolyzed polyacrylamide was used as a salt-sensitive polymer, it is to be understood that other salt-sensitive polymers can also be used in the present invention. Such polymers include water soluble polymers of acrylamide which preferably are of high molecular weight and are substantially linear and further include hydrolyzed polyacrylamides including copolymers of acrylamide and mixtures thereof, and may include chemically modified natural polymers such as carboxyl methyl cellulose. Table II shows the effect of treating a petroleum-bearing formation with an injection of salt-sensitive polymer in aqueous solution and alternately injected brines of different salt concentrations. The present invention takes advantage of the properties of the polymer solution, i.e., the sensitivity of the aqueous solutions' viscosity to the concentration of salt in the solution. Typical salts in solution would include sodium chloride, potassium chloride, magnesium chloride, sodium carbonate, sodium bicarbonate, sodium sulfate, potassium sulfate, calcium carbonate, and traces of other salts commonly found in natural water. The higher the brine salt concentration the less viscous the aqueous polymer solution is and therefore the more easily pumped for injection into a petroleum-bearing formation. The lower viscosity of the solution, the higher the RM and RRM values so that in practice of the invention in the field the aqueous polymer solution can be more easily pumped, will flow more readily from the wellbore into the formation and will penetrate the formation to be treated more readily with less damage to the polymer from high shear effects at the formation face which will result in more additional oil recovery during secondary and tertiary recovery operations for the same amount of energy and polymer expended. The less effective (high) RRM values which are obtained with a low viscosity, high brine solution can be reduced in situ to produce a final RRM value equivalent or superior to that which would otherwise be obtained by injecting the high viscosity, low mobility polymer solution in a lower concentration brine.

Broadly, the present invention is a process comprising the steps of selecting a polymer which is soluble in water and which solution has a viscosity sensitive to the salt concentration in the solution and then forming an aqueous mixture of polymer and inorganic salt to form a low viscosity mixture. The aqueous polymer mixture is then injected into a petroleum-bearing formation which has high brine connate water therein, after which the injection of aqueous polymer mixture is followed with a second injection of a high brine aqueous solution to help move the polymer mixture out into the formation, still in a relatively low viscosity state. After the second injection of the high brine aqueous solution, same is followed by an injection of an aqueous solution having a lower brine concentration than the second injection to adjust the mobility of the polymer in the formation to a desired level which is determined by the specific type of rock in the formation and the type of crude oil therein. Driving fluid is then injected into the formation to pump the petroleum or crude oil to and out of a production well.

Table II shows the effect of such a process as described above by showing the effect of brine concentration on retained relative mobility in Berea cores that have been previously treated with 0.2 percent by weight Dri-Film 144 which is an organosilicon preparation produced and marketed by General Electric. The Berea cores are treated with Dri-Film to make their behavior more nearly approximate that of naturally occurring petroleum-bearing formations. The 0.2 percent Dri-Film 144 is injected in a solution of toluene to flood the core which has previously been evacuated. After the injection of the Dri-Film 144 and toluene, the core is then dried out and baked according to the usual treatment familiar to those skilled in the art of testing such cores. The core is then flooded with water, then oil, if oil is to be used in the particular test, after which the core is again flooded with water to give a residual oil saturation, if desired. Residual oil saturated cores are used in tests 2 and 4 of Table II and tests 1 and 3 are with cores containing only water or brine with the concentration of total dissolved solids being indicated. In carrying out the tests in Table II, the brine present in the core (to approximate naturally occurring formations) initially was the same as the brine in which the polymer was dissolved and injected. W, used in tests 1 and 2 and the $p_w$'s refer to the use of a weak brine of 1200 ppm total dissolved solids and a polymer solution in said weak brine containing 250 ppm polymer. S indicates the injection of a brine solution having 51,000 ppm total dissolved solids. $P_s$ indicates an aqueous polymer solution containing 250 ppm polymer dissolved in water containing 51,000 ppm total dissolved solids. In all the examples, i.e., tests 1, 2, 3 and 4, the RRM was changed twice to obtain the values RRM' and RRM'' by the indicated brine injection. These values were obtained to illustrate the effectiveness of the sequential method and are not necessarily used in actual field use of the present invention.

Tests 1 and 2 are the same except that test 2 contains residual oil in the core and test 1 contains no oil in the core. Tests 3 and 4 are the same except that test 4 contains residual oil and test 3 contains no residual oil in the core. Tests 1 and 2 are used to approximate treatment of a petroleum-bearing formation which has a low brine concentration connate water. For this test, the connate or reservoir water as discussed above contained 1200 ppm total dissolved solids. After injection of the aqueous polymer solution which is a low brine solution and injection of a weak brine solution was made and produced in RRM of 0.08. Next, the core was injected with a slug of strong brine S containing 51,000 ppm total dissolved solids and the RRM increased indicating that the polymer treatment is less effective in the presence of 51,000 ppm brine so that this brine would be less effective in recovering oil. Next, the 1200 ppm total dissolved solids brine W was injected to cause the RRM to be reduced to 0.16 indicating again the increased effectiveness of the polymer in the presence of weak brine. Test 2 was carried out in the same manner as test 1 with the same results generally but different values for RRM.

Tests 3 and 4 were carried out to approximate treatment of a petroleum-bearing formation having a high brine concentration connate water therein which in this test the high brine connate water had 51,000 ppm total dissolved solids. The high brine aqueous polymer solution $P_s$ was mixed in water having 51,000 ppm total dissolved solids and was injected into the cores producing an RM value of 0.12 and 0.09 for tests 3 and 4, respectively. After the injection of $P_s$, same was followed with an injection of a high salt concentration brine containing 51,000 ppm total dissolved solids resulting in the RRM values as listed in column 2. After the second injection, a third injection of a weak brine solution containing 1200 ppm total dissolved solids was made which decreased in situ the RRM' values as indicated in column 3. The weak brine injection was then followed with a second injection of the strong brine to give the RRM'' values as listed in column 4.

In actual field use of the present invention, only certain of the steps of Table II are used. Any of the above listed polymers can be used and in a preferred embodiment the polymer is polyacrylamide (such as Dow Pusher 700) which has a molecular weight of approximately $5.5 \times 10^6$ with the degree of hydrolysis of about 19 is anionic and is substantially linear. In the tests, partially hydrolyzed polyacrylamide was the water soluble polymer used and was in a concentration of 250 ppm (i.e., parts of polymer per million parts of water). This material can be used in both injection and production wells with the concentration of the polymer being in the broad range of 25 to 50,000 ppm, preferably in the range of 100 to 10,000 ppm, and more preferably in the range of 100 to 5,000 ppm. The term "low brine" includes brine solutions having a salt concentration of up to approximately 3,000 ppm and "high brine" would include brines having a salt concentration from a minimum of approximately 3,000 ppm and more preferably 20,000 ppm to 100,000 ppm. It has been found that the viscosity of the aqueous polymer mixture is not reduced significantly in solutions having more than 100,000 ppm of salt. The aqueous polymer mixture is mixed in a suitable manner at temperatures in the range of approximately 50°F (10°C) to 200°F (90°C). The polymer mixture can be used in wells where the temperature range is between about 60°F (15°C) to 300°F (150°C).

In the treatment of petroleum-bearing formations having a strong brine connate water it is known from the data in Table II that injection of an aqueous polymer mixture in a strong brine solution would result in the production of a relatively poor (high) value of RRM in the presence of the strong brine connate water. The treatment of the petroleum-bearing formation would be as follows. The particular polymer to be used is selected and is mixed with high brine concentration water preferably the connate water of the formation to form the aqueous polymer mixture. The strong brine aqueous polymer mixture $P_s$ is injected into the formation. This injection is then followed by an injection of strong brine S preferably connate water. After the injection of strong brine, a low RRM value is developed in situ by an additional injection of a slug of weak brine W having a salt concentration suitable to give the desired RRM value. The injection of weak brine is then followed by a drive fluid which preferably is connate water taken from the formation. It can be seen from Table II that the final RRM'' value obtained when the strong reservoir brine is again present (step 4, tests 3 and 4) can be seen to be as small or smaller than the equivalent RRM' obtained in step 3 (tests 1 and 2) but with the aforementioned advantages obtained by injecting the polymer solution in a low viscosity state in strong brine.

In the case where the petroleum-bearing formation has weak brine connate water the following method is used to treat the formation. An initial slug of strong brine which can be a synthetic brine made by increasing the salt concentration in the weak brine connate water is first injected into the formation to flush same immediately surrounding the wellbore so that the treatment starts with essentially a strong brine reservoir. The method of treatment is then similar to the treatment of the strong brine reservoir formation as described above wherein the polymer is used to form an aqueous polymer mixture having a high salt concentration and relatively low viscosity with the mixture being injected into the formation. The polymer mixture injection is followed by an injection of strong brine S with the first two injections being illustrated by steps 1 and 2 of tests 3 and 4. The injection of strong brine is followed by an injection of weak brine which can be the connate water from the formation which is used to reduce the RRM' value as shown in column 3 of Table II which can be seen to be approximately the same as the RRM values obtained at step 2 in tests 1 and 2 but with the previously mentioned advantages resulting from injection of the polymer in the strong brine. Although not a separate injection, the weak brine which is injected after the strong brine injection is the driving fluid used to move the petroleum through the formation for removal therefrom.

It is to be understood that while I have disclosed certain forms of my invention, it is not to be limited to the specific form described herein.

What is claimed and desired to be secured by letters patent is:

1. A method of treating petroleum-bearing formations with an aqueous solution of salt-sensitive polymer to control mobility in the formation for secondary and tertiary recovery, said method comprising:
    a. selecting as said salt-sensitive polymer, compounds of which the viscosity is decreased by increasing the inorganic salt concentration in aqueous solutions containing such salt-sensitive polymers;
    b. forming an aqueous mixture of said salt-sensitive polymer and inorganic salt to form a high brine concentration mixture;
    c. injecting a first injection of said brine mixture into a petroleum-bearing formation containing high brine water therein;
    d. following the injection of said high brine mixture with a second injection of a high brine aqueous solution;
    e. following the second injection with a third injection of an aqueous brine solution weaker than said high brine mixture and high brine aqueous solution thereby decreasing the salt concentration in the petroleum-bearing formation by admixing with the first and second injections for improving mobility within said petroleum-bearing formation; and
    f. injecting a driving fluid into said formation after said third injection.

2. The method as set forth in claim 1 wherein:
    a. said inorganic salt being in the quantity of at least approximately 3000 ppm to form said high brine aqueous solutions for said first injection and second injection.

3. The method as set forth in claim 2 wherein:
    a. said petroleum-bearing formation having a high brine aqueous solution of connate water therein initially with said aqueous polymer mixture being formed therewith and said second injection and driving fluid injection being made with the connate water from said formation.

4. The method as set forth in claim 2 wherein:
    a. said petroleum-bearing formations having a low brine aqueous solution therein initially and forming said aqueous polymer mixture therewith and adding inorganic salt to make same a high brine mixture, said high brine solution for said second injection being made with said low brine aqueous solution and additional inorganic salt;
    b. said driving fluid and said third injection of weak brine aqueous solution is said low brine aqueous solution and is a single step.

5. The method as set forth in claim 1 wherein:
    a. said salt-sensitive polymer is a water soluble polymer of acrylamide substantially linear and of high molecular weight.

6. The method as set forth in claim 1 wherein:
    a. said salt-sensitive polyacrylamide in the amount of approximately 25 to 50,000 ppm.

7. The method as set forth in claim 6 wherein:
    a. said high brine solutions have inorganic salt in the amount of at least approximately 3000 ppm.

* * * * *

UNITED STATES PATENT AND TRADEMARK OFFICE
CERTIFICATE OF CORRECTION

PATENT NO. : 3,908,764
DATED : September 30, 1975
INVENTOR(S) : Robert R. Harvey It is certified that error appears in the above—identified patent and that said Letters Patent are hereby corrected as shown below:

Column 8, claim 1, element (c), line 23, after "said" should read --- high ---.

Column 8, claim 6, element (a), line 64, after "salt-sensitive" should read --- polymer is ---.

Signed and Sealed this tenth Day of February 1976

[SEAL]

Attest:

RUTH C. MASON
*Attesting Officer*

C. MARSHALL DANN
*Commissioner of Patents and Trademarks*